United States Patent [19]
Jacobovitz-Veselka et al.

[11] Patent Number: 5,278,855
[45] Date of Patent: Jan. 11, 1994

[54] BROADBAND SEMICONDUCTOR SATURABLE ABSORBER

[75] Inventors: Gloria R. Jacobovitz-Veselka, Freehold; Ursula Keller, Highlands, both of N.J.

[73] Assignee: AT&T Bell Laboratories, Murray Hill, N.J.

[21] Appl. No.: 880,928

[22] Filed: May 11, 1992

[51] Int. Cl.$^5$ ............................................. H01S 3/19
[52] U.S. Cl. ........................................ 372/44; 372/11
[58] Field of Search ...................... 372/11, 44, 46, 47, 372/48

[56] References Cited

U.S. PATENT DOCUMENTS

| | | | |
|---|---|---|---|
| 4,597,638 | 7/1986 | Chemla et al. | 350/354 |
| 4,720,309 | 1/1988 | Deveaud et al. | 372/11 |
| 4,860,296 | 8/1989 | Chemla et al. | 372/44 |
| 5,007,059 | 4/1991 | Keller | 372/18 |

OTHER PUBLICATIONS

U. Keller et al., *Optical Letters*, vol. 15, No. 23, Dec. 1, 1990, "Coupled-cavity resonant passive mode-locked . . .," pp. 1377–1379.

J. H. Lee et al., *Appl. Phys. Letter*, vol. 58, No. 14, Apr. 8, 1991, "Active-passive mode-locked Nd:YAG laser . . .," pp. 1464–1466.

U. Keller et al., *Optics Letters*, vol. 16, No. 6, Mar. 15, 1991, "Coupled-cavity resonant passive mode-locked Nd:yttrium . . .," pp. 390–392.

H. A. Haas, *J. Opt. Soc. Am. B.*, vol. 8, No. 6, Jun. 1991, "Theory of coupled-cavity mode locking with . . .," pp. 1252–1258.

A. J. Moseley et al., *Quantum Optoelectronics Technical Digest*, TuD12, Mar. 11–13, 1991, Salt Lake City, "Broadband GaAs/Al$_x$Ga$_{1-x}$As Multi-Quantum Well LED," pp. 193–196.

*Primary Examiner*—Rodney B. Bovernick
*Assistant Examiner*—Robert E. Wise
*Attorney, Agent, or Firm*—Gregory C. Ranieri

[57] ABSTRACT

Extended wavelength tunability is achieved in a saturable absorber for applications such as modelocking lasers by realizing a semiconductor structure having a tapered energy bandgap profile in a portion of the saturable absorber wherein the profile is given as a function of the distance along the propagation axis of the saturable absorber. For certain applications, at least one mirror is monolithically integrated with the saturable absorber.

10 Claims, 2 Drawing Sheets

BROADBAND SEMICONDUCTOR SATURABLE ABSORBER

TECHNICAL FIELD

This invention relates to saturable absorbing elements and, more particularly, to semiconductor saturable absorbers.

BACKGROUND OF THE INVENTION

Extremely short duration optical pulses are important for high speed signal processing and communications. Optical pulses in this category are commonly called ultrashort optical pulses and have durations in the picosecond and sub-picosecond range. Ultrashort optical pulses have been obtained by techniques such as passive modelocking wherein a nonlinear element is placed either within the lasing cavity or within a cavity external to the lasing cavity. One such nonlinear element is a saturable absorber.

Saturable absorbers are materials which display a change in opacity related to the incident radiation intensity at a particular wavelength. Solids, liquids, and gasses may be used as saturable absorbers based upon the chosen wavelength of operation. The saturable absorber acts as a shutter. It absorbs all weak radiation incident upon it. As the intensity of the incident radiation reaches a sufficiently high level called the saturation intensity of the saturable absorber, the incident radiation is permitted to pass through the absorber. In general, the attenuation of the incident radiation caused by the saturable absorber is relatively low because the absorber is saturated into a transparent state at the wavelength for the incident radiation.

Organic materials such as dyes exhibit a broadband absorption response of several hundred nanometers. But, dyes require the use of mechanical elements such as nozzles and the like which are relatively large, subject to mechanical malfunction, and not easily integrable with solid state lasers. When used as saturable absorption elements, semiconductors form compact, reliable elements suitable for integration with solid state lasers. In contrast to organic materials, semiconductor materials are inherently narrowband saturable absorption elements having an absorption response of several tens of nanometers. Generally, semiconductor materials have a significantly narrower operating range than the tuning bandwidth of the laser system in which the semiconductor materials act as saturable absorbers. In order to modelock the laser for pulsed operation at a particular wavelength in the tuning range of a laser, it would be necessary to have a plurality of different replaceable narrowband saturable absorbers to cover the entire tuning range of wavelengths for the laser. Thus, there is no single solid state saturable absorber available having a sufficiently broadband absorption response which is substantially coextensive with the tuning range of available lasers.

SUMMARY OF THE INVENTION

Extended wavelength tunability is achieved in a saturable absorber for applications such as modelocking lasers by realizing a semiconductor structure having a bandgap profile exhibiting a bandgap energy taper along at least a portion of the propagation axis of the saturable absorber. In certain applications, the saturable absorber is monolithically integrated with at least one reflective element.

In one embodiment, the saturable absorber includes compositionally graded bulk semiconductor material having one or more semiconductor constituents whose mole ratios are substantially increased or decreased in a substantially continuous manner across the absorber.

In another embodiment, narrow bandgap quantum well layers are formed between appropriate wide bandgap barrier layers wherein the bandgap energy of each successive quantum well layer is modulated in a substantially decreasing manner from one end of the saturable absorber to the other. Actual modulation of the bandgap energy requires that each quantum well layer comprise a slightly different semiconductor material composition so that the bandgap energy decreases from quantum well layer to quantum well layer. An alternative actual modulation of the bandgap energy is accomplished by varying the thickness of each quantum well layer in a substantially monotonic increasing or decreasing manner.

Alternative embodiments of the present invention recognize the desirability of cascading sections of different energy bandgap profiles, each profile exhibiting the desired increasing or decreasing profile, so that the entire saturable absorber has a broadband absorption response.

It has been stated that the taper of bandgap energy be from one end of the saturable absorber to the other, and it is understood that the above embodiments may be combined into a single saturable absorber and that tapering need only be accomplished over a portion of the saturable absorber.

BRIEF DESCRIPTION OF THE DRAWING

A more complete understanding of the invention may be obtained by reading the following description of specific illustrative embodiments of the invention in conjunction with the appended drawing in which.

The structures in the figures have not been drawn to scale. This has been done to promote a clearer illustration and understanding of the invention. Dimensions for the semiconductor structures are provided in the description below.

DETAILED DESCRIPTION

Modelocking and Q-switching of lasers are two important applications for saturable absorbers realized in accordance with the principles of the present invention. Another important application of the present saturable absorber is providing amplitude modulation to start another modelocking operation such as self-focussing modelocking. An example of the general device structure for the latter application is described in *Opt. Lett.*, Vol. 16, p. 1022 (1991).

It is noted that the terms "wavelength" and "frequency" are used interchangeably without affecting the understanding of the principles of the present invention. Wavelength ($\lambda$) and frequency (f) are related by the well known equation, $\lambda = c/f$ where c is the speed of light in a vacuum.

Figure 1:
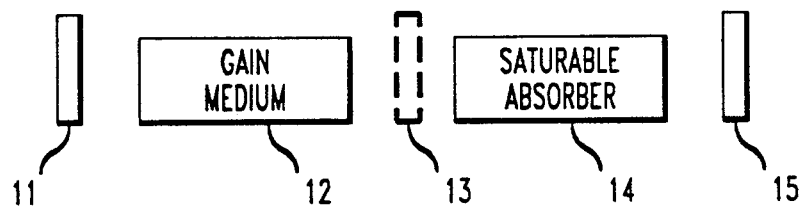
FIG. 1 shows a simplified schematic diagram of a laser system including a saturable absorber.

For the laser system shown in FIG. 1, gain medium 12 is combined with saturable absorber 14 either in the same resonant cavity defined by reflective elements 11 and 15 or in separate, coupled cavities formed by reflective elements 11, 13, and 15. When operating in the same resonant cavity as the gain medium, saturable absorber 14 is called an intra-cavity saturable absorber. When operating in a separate, but coupled external, cavity from the gain medium, saturable absorber 14 is called an external cavity saturable absorber. The saturable absorber described below and realized in accordance with the principles of the present invention is well suited for operation as either an intra-cavity saturable absorber or an external cavity saturable absorber.

Saturable absorber element 14 comprises a nonlinear, semiconductor material which is contemplated as being absorptive. Nonlinearity of the saturable absorber element is a function of the intensity of the incident optical radiation at or near a particular wavelength, the absorption cross-section, and the material thickness. Bulk semiconductor material and multiple quantum wells are now found to be suitable for realizing the saturable absorbers in accordance with the principles of this invention. In the case of resonant nonlinearities, the wavelength range over which the saturable absorber operates effectively is limited. When such resonant nonlinearities are coupled with tunable laser sources, the tunability of the modelocked source is limited by the operational range of the nonlinearity. Thus, nonlinearities realized in accordance with the principles of the present invention and operating effectively over a wide range of wavelengths are desirable for combination with tunable sources. As a result, it is possible to now realize a modelocked or Q-switched laser system including a solid-state saturable absorber operable over the tuning range of the laser.

The laser system shown in FIG. 1 includes a tunable solid state laser such as a Ti:sapphire laser or the like for ultrashort pulse generation and the saturable absorber. Although the laser system is drawn as a collinear arrangement of elements in the single cavity or in the coupled cavities, it is understood that other cavity arrangements and geometries are contemplated. One exemplary non-collinear geometry for a coupled cavity arrangement is shown in FIG. 1 of U.S. Pat. No. 5,007,059.

While the exemplary embodiments of the invention are described herein with reference to a particular gain medium 12 which is tunable over its particular range of wavelengths, it will be understood from the description herein that the principles of the present invention are equally applicable to other gain media having their own particular wavelength tuning ranges.

Figure 2:
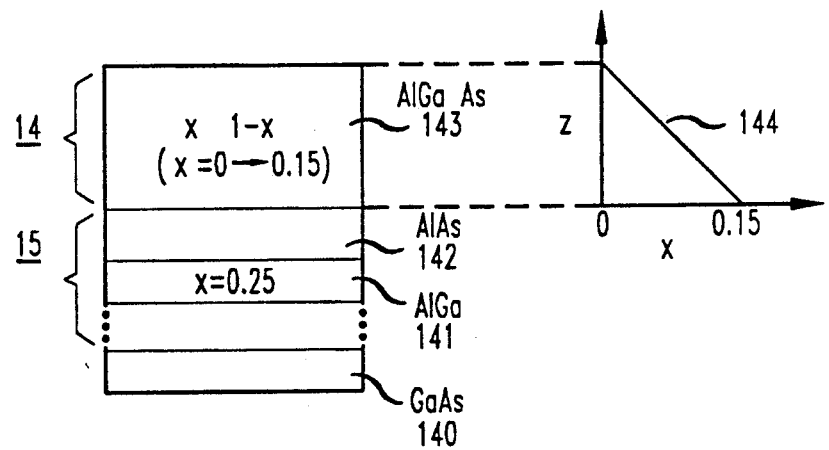
FIG. 2 depicts a both across-sectional view of a semiconductor material layer structure for realizing the saturable absorber of FIG. 1 and a profile of the Al mole ratio as a function of distance z.

In one example from experimental practice, saturable absorber 14 with integrated end reflective element 15 was fabricated in the AlGaAs/GaAs (Group III-V) semiconductor system as shown in FIG. 2. Saturable absorber 14 comprised bulk compositionally graded semiconductor material $Al_xGa_{1-x}As$ where x is a value between 0.0 and 1.0 and denotes the mole fraction or mole ratio of Al. For this example, x was varied in a continuous monotonic manner from 0.0 to 0.15 to form a 1.0 μm thick absorbing layer 143. Curve 144 depicts the variation of the mole fraction x as a function of the layer thickness z measured perpendicular to the growth plane of the layer. The direction z is also substantially parallel to the propagation axis of light through the saturable absorber. The absorption response has been measured for the exemplary saturable absorber 14 over the wavelength range from 770 nm to 870 nm.

Exemplary integrated reflective element 15 comprised a dielectric mirror having sixteen periods of the pair of layers 141 and 142 wherein layer 142 included AlAs (x=1.0) and layer 142 comprised AlGaAs (x=0.25). The optical thickness of each layer in the dielectric mirror is substantially equal to a quarter-wave thickness ($\lambda/4$ n, where n is the effective refractive index for the particular layer) at the wavelength ($\lambda$) for the incident light. In the example, the thickness of the layer pairs was sufficient to achieve reflective operation over the wavelength range from approximately 780 nm to 860 nm with a center wavelength of 820 nm. Due to the narrower reflectivity range of the mirror as compared to the absorption range of the absorber, the tunability achieved was on the order of 77 nm. This is greater than the tunability for any prior reported solid-state saturable absorber.

Low temperature MBE growth at approximately 380° C. was employed for fabricating saturable absorber 14 while standard MBE growth at 640° C. was performed to realize reflective element 15 on GaAs substrate 140. Low temperature growth is utilized to reduce carrier lifetime and thereby achieve a relatively fast saturable absorber element 14. Carrier lifetime for the particular example described above is determined to be approximately several tens of picoseconds. Since low temperature growth increases the amount of unsaturable loss in the absorber element, it is understood that the saturable absorber as described herein exhibits less sensitivity to these unsaturable losses. While low temperature MBE has been described above for realizing an exemplary saturable absorber element, other epitaxial growth techniques such as vapor phase epitaxy, liquid phase epitaxy and standard MBE are contemplated for realizing the saturable absorber and its constituent elements. No intentional doping is performed on this structure although doping of the semiconductor layers is contemplated for alternative embodiments.

Reflectivity of element 15 is determined by the particular application. For the embodiment shown, a high reflectivity for element 15 is preferred to avoid thermal effects from damaging the integrated saturable absorber/mirror structure. Generally, whether the reflective element 15 is integrated with the saturable absorber or not, it is desirable to insure that the reflectivity response band of the reflective element is substantially coextensive with the absorption response of the broadened response saturable absorber realized in accordance with the principles of the present invention.

An alternative reflective element 15 is realizable on saturable absorber 14 using substantially the structure shown in FIG. 2 by omitting the dielectric stack of layer pairs (layers 141 and 142) and growing the saturable absorber either directly on substrate 140 or on intermediate semiconductor AlGaAs buffer layer (not shown) over the substrate. Etching of a portion of the substrate exposes the underside of the saturable absorber or, if it is non-absorbing at the wavelengths of interest, the buffer layer. On the exposed portion of saturable absorber 14 or the buffer layer, a metallic (e.g., gold) or dielectric stack of layers such as oxides (e.g., $SiO_2$ and $TiO_2$) may be formed to exhibit the appropriate reflectivity and response bandwidth.

It is contemplated that optional reflective element 13 can be formed as a stack of dielectric layers deposited on top of saturable absorber layer 143. Dielectric oxides such as $TiO_2$ and $SiO_2$ and semiconductor materials are contemplated for the fabrication of such layers. Techniques for depositing dielectric layers of the reflective element and for determining the appropriate layer of thicknesses to achieve to desired reflectivity are well known to persons skilled in the art and are not described herein.

Reflective elements 13 and 15 are contemplated as dielectric or semiconductor or metallic reflectors. Reflectivities for elements 13 and 15 are contemplated as varying over a wide range of values. In most applications, reflective element 13 is the "input" for saturable absorber 14 which means that light (optical radiation) from a gain medium or a laser is incident initially upon reflective element 13. When the light is from a gain medium such as a pumped Nd:YLF crystal or the like, reflective element 13 together with another end reflective element as shown in FIG. 1 forms the laser cavity. As such reflective element 13 is required to have a reflectivity at or above 30%. In terms of a Fabry-Perot saturable absorber design as described in co-pending U.S. patent application Ser. No. 07/778,641, the spacing of the reflective elements 13 and 15 and the reflectivity of reflective element 13 are important.

In the description above, the stoichiometric composition of the saturable absorber was changed during growth. Broader bandwidths are expected even in the same material system since $Al_xGa_{1-x}As$, x varied from 0.0 to 0.45, provides a 250 nm bandwidth from 870 nm to 620 nm. Above x=0.45, AlGaAs reverts to a indirect bandgap material which is unsuitable for the practice of this invention.

Figure 3:
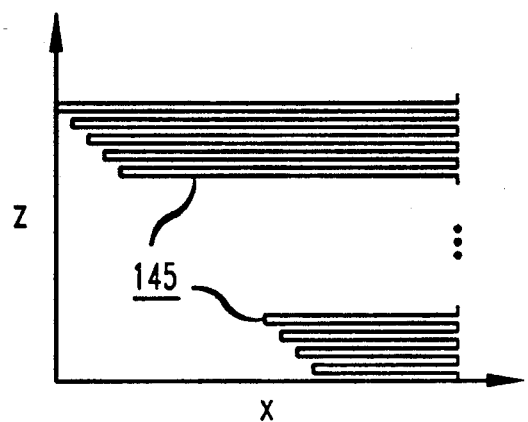
FIGS. 3 and 4 are simplified mole ratio profiles for quantum well realizations of the saturable absorber of FIG. 1.
Figure 4:
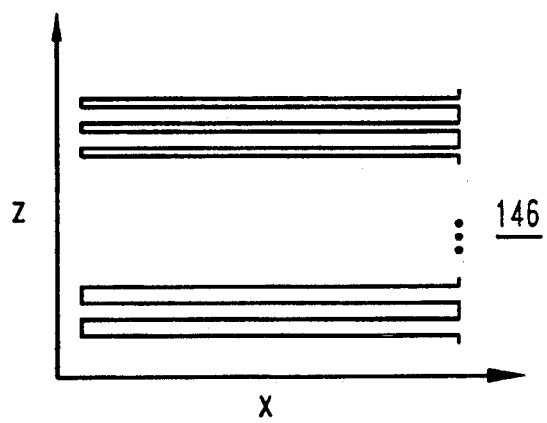

Other saturable absorber structures achievable by bandgap engineering include quantum well structures as shown in FIGS. 3 and 4. Quantum well structures are defined as thin layers of alternating wide bandgap (barrier) and narrow bandgap (quantum well) semiconductor material. Broadband saturable absorption is achieved by varying the quantum well depth (FIG. 3) or varying the quantum well thickness (FIG. 4).

As shown in FIG. 3, the mole fraction profile 145 related to the conduction band profile for the energy bandgaps of quantum well saturable absorber 14 is shown as a function of the thickness of the absorber. Quantum wells 1 are separated from each other by barriers 2. The wells and barriers are comprised in this example of $Al_xGa_{1-x}As$ where x in the quantum wells is decreased from one well to the next. The relationship between the mole fraction of constituent semiconductor elements of a particular compound and the energy bandgap of that compound is believed to be well known and described in U.S. Pat. No. 4,597,638 at FIG. 15 and S. M. Sze, *Physics of Semiconductor Devices*, 2nd Ed. p. 706, (1981).

As shown in FIG. 4, the mole fraction profile 146 related to the conduction band profile for the energy bandgaps of quantum well saturable absorber 14 is shown as a function of the thickness z of the absorber. Quantum wells 3 are separated from each other by barriers 4. The thickness of each successive quantum well is decreased as z increases. For an exemplary saturable absorber structure, 50 Å thick $Al_{0.4}Ga_{0.6}As$ barriers are interleaved with GaAs (x=0) quantum wells whose thickness ranges from 200 Å to approximately 35 Å giving an absorber bandwidth of 75 nm (783 nm to 858 nm).

Antireflection coating may be applied to the surfaces of saturable absorber 14. If saturable absorber 14 is separate from reflective elements 13 and 14, then both end surfaces are antireflection coated using standard coatings and coating techniques. In the transmission mode, it is desirable to utilize a substrate material which is transparent in the wavelength range of interest. For example, GaAs substrate is transparent to wavelengths in the 2.5 μm bandwidth (870 nm to 3.4 μm) for $In_xGa_{1-x}As$ saturable absorber layer, where the In mole fraction x is varied from 0.0 to 1.0. Where the substrate material is not transparent to the wavelengths of interest, it is preferable to etch a portion of that material away to permit passage of the lightbeams. Alternatively, a dielectric mirror is interposed between the absorbing material and the substrate as shown in FIG. 2.

Although the figures depict a mole fraction profile and, therefore, a bandgap profile which is monotonically changing as a function of the saturable absorber thickness, it is contemplated that the variations can be other than monotonic and/or continuous in nature. That is, it may be desirable to vary the energy bandgap in an increasing manner for a certain thickness followed by another thickness in which the energy bandgap is decreased. Similarly, continuous variation of the energy bandgap may be approximated by stepwise-continuous approximations. Moreover, bandgap variations need not be linear as shown in FIG. 2. Nonlinear variations such as quadratic, cubic, and other such nonlinear functions are contemplated for describing the bandgap variation as a function of thickness of the saturable absorber element for any portion thereof.

It is understood that, while the material system GaAs/AlGaAs is described above for fabricating the saturable absorber element other material combinations may be selected from other semiconductor Group III-V systems such as GaAs/InGaAs, InGaAs/InGaAlAs, InGaAs/InAlAs, GaAs/AlAs, GaAsSb/GaAlAsSb and InGaAsP/InP to achieve saturable absorption at different desired wavelengths. In these semiconductor systems, the layers may be lattice-matched to suitable GaAs or InP substrates. Mismatching is also contemplated wherein strained layers are grown over the substrate material. Finally, extension of the device structures is also contemplated to semiconductor compounds in Group II-VI and Group IV.

What is claimed is:

1. A laser system comprising a first and second end reflectors, a gain medium tunable over a first range of wavelengths, and a saturable absorber responsive over a second range of wavelengths substantially included in the first range of wavelengths, both of the latter being disposed in an optical cavity defined by the first and second end reflectors, the saturable absorber including compositionally graded bulk semiconductor material wherein said compositional grading is defined along a direction substantially parallel to a light propagation axis through the saturable absorber.

2. The laser system as defined in claim 1 wherein the semiconductor material is $Al_xGa_{1-x}As$ for x varied between 0.0 and 0.45.

3. The laser system as defined in claim 1 wherein the semiconductor material is $In_xGa_{1-x}As$ for x varied between 0.0 and 1.0.

4. The laser system as defined in claim 1 wherein the second reflector is integrated monolithically with the saturable absorber.

5. A laser system comprising a first and second end reflectors, a gain medium tunable over a first range of wavelengths, and a saturable absorber responsive over a second range of wavelengths substantially included in the first range of wavelengths, both of the latter being disposed in an optical cavity defined by the first and second end reflectors, the saturable absorber including a quantum well region having a plurality of quantum well layers alternating with a corresponding plurality of barrier layers, the quantum well layers comprising narrow bandgap semiconductor material and the barrier layers comprising wide bandgap semiconductor material, wherein a predetermined characteristic of successive quantum well layers is varied along a direction substantially parallel to a light propagation axis for the saturable absorber.

6. The laser system as defined in claim 5 wherein the predetermined characteristic is the thickness of the quantum well layer.

7. The laser system as defined in claim 6 wherein the second reflector is integrated monolithically with the saturable absorber.

8. The laser system as defined in claim 5 wherein the predetermined characteristic is a bandgap energy of the quantum well layer.

9. The laser system as defined in claim 8 wherein each quantum well layer comprises $Al_xGa_{1-x}As$ where x is varied over the range 0.0 to 0.45.

10. The laser system as defined in claim 9 wherein the second reflector is integrated monolithically with the saturable absorber.

* * * * *